(12) United States Patent
Deshpande et al.

(10) Patent No.: US 10,373,102 B2
(45) Date of Patent: Aug. 6, 2019

(54) SYSTEM AND METHOD TO INCORPORATE NODE FULFILLMENT CAPACITY AND CAPACITY UTILIZATION IN BALANCING FULFILLMENT LOAD ACROSS RETAIL SUPPLY NETWORKS

(71) Applicant: International Business Machines Corporation, Armonk, NY (US)

(72) Inventors: Ajay A. Deshpande, White Plains, NY (US); Saurabh Gupta, Irving, TX (US); Arun Hampapur, Norwalk, CT (US); Alan J. King, South Salem, NY (US); Ali Koc, White Plains, NY (US); Yingjie Li, Chappaqua, NY (US); Xuan Liu, Yorktown Heights, NY (US); Christopher S. Milite, Oxford, CT (US); Brian L. Quanz, Yorktown Heights, NY (US); Chek Keong Tan, Danbury, CT (US); Dahai Xing, White Plains, NY (US); Xiaobo Zheng, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 573 days.

(21) Appl. No.: 15/087,569

(22) Filed: Mar. 31, 2016

(65) Prior Publication Data
US 2017/0206499 A1   Jul. 20, 2017

Related U.S. Application Data

(60) Provisional application No. 62/279,738, filed on Jan. 16, 2016.

(51) Int. Cl.
G06Q 30/00 (2012.01)
G06Q 10/08 (2012.01)
(Continued)

(52) U.S. Cl.
CPC ..... G06Q 10/08345 (2013.01); G06F 3/0482 (2013.01); G06F 3/04847 (2013.01);
(Continued)

(58) Field of Classification Search
CPC .............. G06Q 50/28; G06Q 10/063
See application file for complete search history.

(56) References Cited

U.S. PATENT DOCUMENTS 7,370,005 B1   5/2008   Ham et al.
7,917,387 B2   3/2011   Spurr et al.
(Continued)

FOREIGN PATENT DOCUMENTS

WO   2005067434 A2   7/2005

OTHER PUBLICATIONS

Acimovic, J. A., "Lowering Outbound Shipping Costs in an Online Retail Environment by Making Better Fulfillment and Replenishment Decisions", Aug. 2012, pp. 1-198, MIT PhD thesis.
(Continued)

Primary Examiner — Talia F Crawley
(74) Attorney, Agent, or Firm — Scully, Scott, Murphy & Presser, P.C.; Grant Johnson, Esq.

(57) ABSTRACT

A method and system for evaluating node fulfillment capacity in node order assignment. The method includes receiving a current order for node order assignment. The method also includes retrieving data of each node from a plurality of nodes, the retrieved data comprising current capacity utilization, capacity of a current day and capacity of a future day. The method then includes determining a probability of backlog on an expected ship date of each node, the probability of backlog being based on the retrieved current capacity utilization. Further, the method includes automatically converting the probability of backlog, backlog cost, and labor cost of each node into a capacity utilization cost
(Continued)

of the each node using a capacity utilization cost model defining a set of predetermined capacity utilization threshold values. Then, the method includes automatically calculating a fulfillment cost of each node of the current order by adding a plurality of costs.

20 Claims, 10 Drawing Sheets

(51) Int. Cl.
| | |
|---|---|
| *G06Q 30/02* | (2012.01) |
| *G06N 20/00* | (2019.01) |
| *G06F 16/14* | (2019.01) |
| *G06F 16/182* | (2019.01) |
| *G06F 16/17* | (2019.01) |
| *G06F 16/23* | (2019.01) |
| *G06F 3/0482* | (2013.01) |
| *G06F 3/0484* | (2013.01) |
| *G06Q 30/06* | (2012.01) |
| *H04L 12/26* | (2006.01) |
| *G06N 5/04* | (2006.01) |
| *G06Q 10/06* | (2012.01) |

(52) U.S. Cl.
CPC ........ *G06F 16/148* (2019.01); *G06F 16/1734* (2019.01); *G06F 16/183* (2019.01); *G06F 16/1844* (2019.01); *G06F 16/2365* (2019.01); *G06N 5/04* (2013.01); *G06N 5/045* (2013.01); *G06N 20/00* (2019.01); *G06Q 10/0633* (2013.01); *G06Q 10/06315* (2013.01); *G06Q 10/06375* (2013.01); *G06Q 10/083* (2013.01); *G06Q 10/087* (2013.01); *G06Q 10/0833* (2013.01); *G06Q 10/0838* (2013.01); *G06Q 10/0875* (2013.01); *G06Q 30/0201* (2013.01); *G06Q 30/0206* (2013.01); *G06Q 30/0283* (2013.01); *G06Q 30/0284* (2013.01); *G06Q 30/0635* (2013.01); *H04L 43/0882* (2013.01); *H04L 43/16* (2013.01); *H04L 43/0876* (2013.01)

(56) References Cited

U.S. PATENT DOCUMENTS

| | | | |
|---|---|---|---|
| 8,015,081 B1 | 9/2011 | Franco | |
| 8,065,172 B2 | 11/2011 | Mauthe et al. | |
| 8,204,799 B1 | 6/2012 | Murray et al. | |
| 8,249,917 B1 | 8/2012 | Kassmann et al. | |
| 8,352,382 B1* | 1/2013 | Katta | G06Q 50/28 705/330 |
| 8,374,922 B1* | 2/2013 | Antony | G06Q 30/00 705/26.1 |
| 8,626,333 B2 | 1/2014 | Waddington et al. | |
| 8,700,443 B1* | 4/2014 | Murray | G06Q 10/087 705/7.31 |
| 8,818,836 B1* | 8/2014 | Braumoeller | G06Q 10/063 705/7.25 |
| 9,324,048 B2* | 4/2016 | Ptak | G06Q 10/06311 |
| 9,940,603 B1* | 4/2018 | Caven | G06Q 10/087 |
| 2003/0093388 A1 | 5/2003 | Albright | |
| 2012/0150583 A1 | 6/2012 | Dueck et al. | |
| 2012/0150692 A1 | 6/2012 | Dueck et al. | |
| 2014/0136255 A1 | 5/2014 | Grabovski et al. | |
| 2014/0310048 A1* | 10/2014 | Murray | G06Q 10/087 705/7.22 |
| 2015/0052019 A1 | 2/2015 | Field-Darraugh et al. | |
| 2015/0112905 A1* | 4/2015 | Miner | G06N 7/00 706/13 |
| 2015/0112906 A1* | 4/2015 | Gauthier | G06N 7/00 706/13 |
| 2017/0083967 A1* | 3/2017 | Shiely | G06Q 30/0639 |

OTHER PUBLICATIONS

Kewill Corporation, "Omni-channel Optimization for Retailers: Fulfillment best practice to deliver on customer promises and drive down returns", Jul. 2013, pp. 1-12.

Xu, P. J., "Order Fulfillment in Online Retailing: What Goes Where", Sep. 2005, pp. 1-146, MIT Thesis.

Mell, P. et al., "The NIST Definition of Cloud Computing", NIST Special Publication 800-145, National Institute of Standards and Technology, U.S. Department of Commerce, Sep. 2011, pp. 1-7.

* cited by examiner

SYSTEM AND METHOD TO INCORPORATE NODE FULFILLMENT CAPACITY AND CAPACITY UTILIZATION IN BALANCING FULFILLMENT LOAD ACROSS RETAIL SUPPLY NETWORKS

CROSS REFERENCE TO RELATED PATENTS AND APPLICATIONS

This application claims priority from U.S. Provisional Application No. 62/279,738 filed on Jan. 16, 2016, which is incorporated by reference herein in its entirety.

BACKGROUND

This disclosure is directed to computer generated node order fulfillment performance and more particularly, to computer generated node order fulfillment performance considering capacity utilization cost.

Omni-channel retailers employ a number of channels to fulfill online orders. One approach to find optimal fulfillment solutions is to model the fulfillment problem as a multi-objective optimization problem, where the solution is order item assignments across a large number of fulfillment candidate nodes (stores, ecommerce fulfillment centers, etc.).

A key issue when assigning a part of an order to a node for fulfillment is that the order can get backlogged due to limited node capacity, that is, the laborers who can pick the items at the node and fulfill the order. Node capacity is especially a problem when non-traditional fulfillment nodes are considered in the node fulfillment decision such as stores in the recent ship-from-store trend. On the other hand, nodes can remain underutilized—having more capacity available than is being used. Therefore, factoring in the node fulfillment capacity and capacity utilization of a node would be useful for balancing fulfillment load across retail supply networks and avoiding costly delays due to overloading the current resources of the node.

SUMMARY OF THE INVENTION

One embodiment is directed to a method for evaluating node fulfillment capacity in node order assignment. The method includes receiving a current order for node order assignment. The method also includes retrieving data of each node from a plurality of nodes, the retrieved data of each node comprising current capacity utilization. The method then includes determining a probability of backlog on an expected ship date of each node of the plurality of nodes, the probability of backlog being based on the retrieved current capacity utilization. Further, the method includes automatically converting the probability of backlog, backlog cost, and labor cost of each node of the plurality of nodes into a capacity utilization cost of the each node using a capacity utilization cost model defining a set of predetermined capacity utilization threshold values. Then, the method includes automatically calculating a fulfillment cost of each node of the plurality of nodes of the current order by adding a plurality of costs.

In one embodiment, the retrieved data of each node further comprises backlog data, capacity of a current day and capacity of a future day. Backlog data is the backlog units at the beginning of the current day. In another embodiment, the system further automatically calculates an actual capacity utilization on the expected ship date of each node of the plurality of nodes, the actual capacity utilization being based on the retrieved current capacity utilization, the backlog data, the capacity of a current day and the capacity of a future day.

In one embodiment, when there is enough capacity for the current day, the actual capacity utilization is calculated by adding the result of the backlog divided by the capacity of a current day to the current capacity utilization. In another embodiment, when there is not enough capacity for the current day, the actual capacity utilization is calculated by the backlog on an expected ship date divided by the capacity of that day, where the backlog on an expected ship date is calculated by adding the result of the current capacity utilization multiplied by the capacity of a current day to the backlog and subtracting the result of the capacity of each day before the expected ship date multiplied by the backlog days of the current order before the expected ship date.

In one embodiment, the probability of backlog is calculated by historical data of backlogged orders at the current capacity utilization divided by historical data of total orders at the current capacity utilization. In another embodiment, the probability of backlog is further based on hours left in the current day.

In one embodiment, the method further includes determining a number of days of backlog on an expected ship date of each node of the plurality of nodes. The number of days of backlog is based on the retrieved current capacity utilization. The capacity utilization cost further considers the number of days of backlog. The probability of an order having different possible number of days (0 days, 1 day, 2 days etc.) of backlog is retrieved from historical data. Upon assigning an order to a node, the order has a probability of being backlogged for 0 days, 1 day, 2 days, etc. For each historical order, the final number of days that order was in backlog is taken along with the state of the node at the time the order was assigned, including current capacity utilization, cumulative capacity utilization level (actual capacity utilization), as well as other possible input features such as hours left in the day. A probabilistic model is designed that provides as output the number of days of backlog given the state of the node as input features. The input features can be set to a count probability distribution such as the Poisson distribution, the Negative Binomial distribution, or Gamma distribution. Furthermore, a cost of backlog is associated with each number of days (0 days, 1 day, 2 days etc.), reflecting the cost incurred if the order were backlogged for that number of days. Finally, the capacity utilization cost is then determined as the expected cost under this per-day distribution and costs. For example, the probability of 0 days of backlog multiplied by the cost of 0 days of backlog, plus the probability of 1 day of backlog multiplied by the cost of 1 day of backlog, and so on. The model then automatically sums up a total cost incurred by the possible backlog days for rendering a capacity utilization cost.

One embodiment is directed to a capacity utilization cost system for evaluating node fulfillment capacity in node order assignment. The computer system includes one or more non-transitory computer readable storage media and program instructions, stored on the one or more non-transitory computer-readable storage media, which when implemented by a user interface accessing a service provider website, cause the computer system to perform the step of receiving a current order for node order assignment. The method also includes retrieving data of each node from a plurality of nodes, the retrieved data of each node comprising current capacity utilization. The method then includes determining a probability of backlog on an expected ship date of each node of the plurality of nodes, the probability of backlog being based on the retrieved current capacity utilization. Further, the method includes automatically converting the probability of backlog, backlog cost, and labor cost of each node of the plurality of nodes into a capacity utilization cost of the each node using a capacity utilization cost model defining a set of predetermined capacity utilization threshold values. Then, the method includes automatically calculating a fulfillment cost of each node of the plurality of nodes of the current order by adding a plurality of costs.

One embodiment is directed to a non-transitory article of manufacture tangibly embodying computer readable instructions, which when implemented, causing a computer to perform the steps of receiving a current order for node order assignment. The method also includes retrieving data of each node from a plurality of nodes, the retrieved data of each node comprising current capacity utilization. The method then includes determining a probability of backlog on an expected ship date of each node of the plurality of nodes, the probability of backlog being based on the retrieved current capacity utilization. Further, the method includes automatically converting the probability of backlog, backlog cost, and labor cost of each node of the plurality of nodes into a capacity utilization cost of the each node using a capacity utilization cost model defining a set of predetermined capacity utilization threshold values. Then, the method includes automatically calculating a fulfillment cost of each node of the plurality of nodes of the current order by adding a plurality of costs.

BRIEF DESCRIPTION OF THE DRAWINGS

These are other objects, features and advantages of the present invention will become apparent from the following detailed description, which is to be read in connection with the accompanying drawing, in which.

DETAILED DESCRIPTION

This invention is a system and method for evaluating node fulfillment capacity in node order assignment. This invention incorporates node fulfillment capacity and capacity utilization into a calculation of fulfillment cost in a fulfillment engine, for example, into a multi-objective optimization-based engine to factor in when balancing a number of objectives for node order assignment. The invention derives a mathematical modeling approach enabling the incorporation of node fulfillment capacity and capacity utilization into a fulfillment engine, and a methodology for converting the raw retail data into a calculable fulfillment capacity utilization cost. This invention enables providing a real dollar cost for load balancing based, on future predicted/expected cost, and thus enables trading off with other order fulfillment objectives that have real dollar values such as shipping cost.

Node fulfillment capacity and capacity utilization are modeled in such a way that in general, the node with lower cumulative capacity utilization is preferred, or, given equal current capacity consumption, the node with higher capacity is preferred. The weight applied to the calculated fulfillment capacity utilization cost can be adjusted to trade-off between improving fulfillment capacity utilization with other business objectives.

By factoring in node fulfillment capacity and capacity utilization in the fulfillment decision, the retailers are able to balance the workload between fulfillment nodes with their actual, real-time capacity and capacity utilization; reduce labor cost from extra workers hired for order fulfillment at a node beyond its capacity or else avoid future delaying or upgrading of orders due to failure of an over-loaded node to process (pick, pack, and ship) all orders on time.

Figure 1:
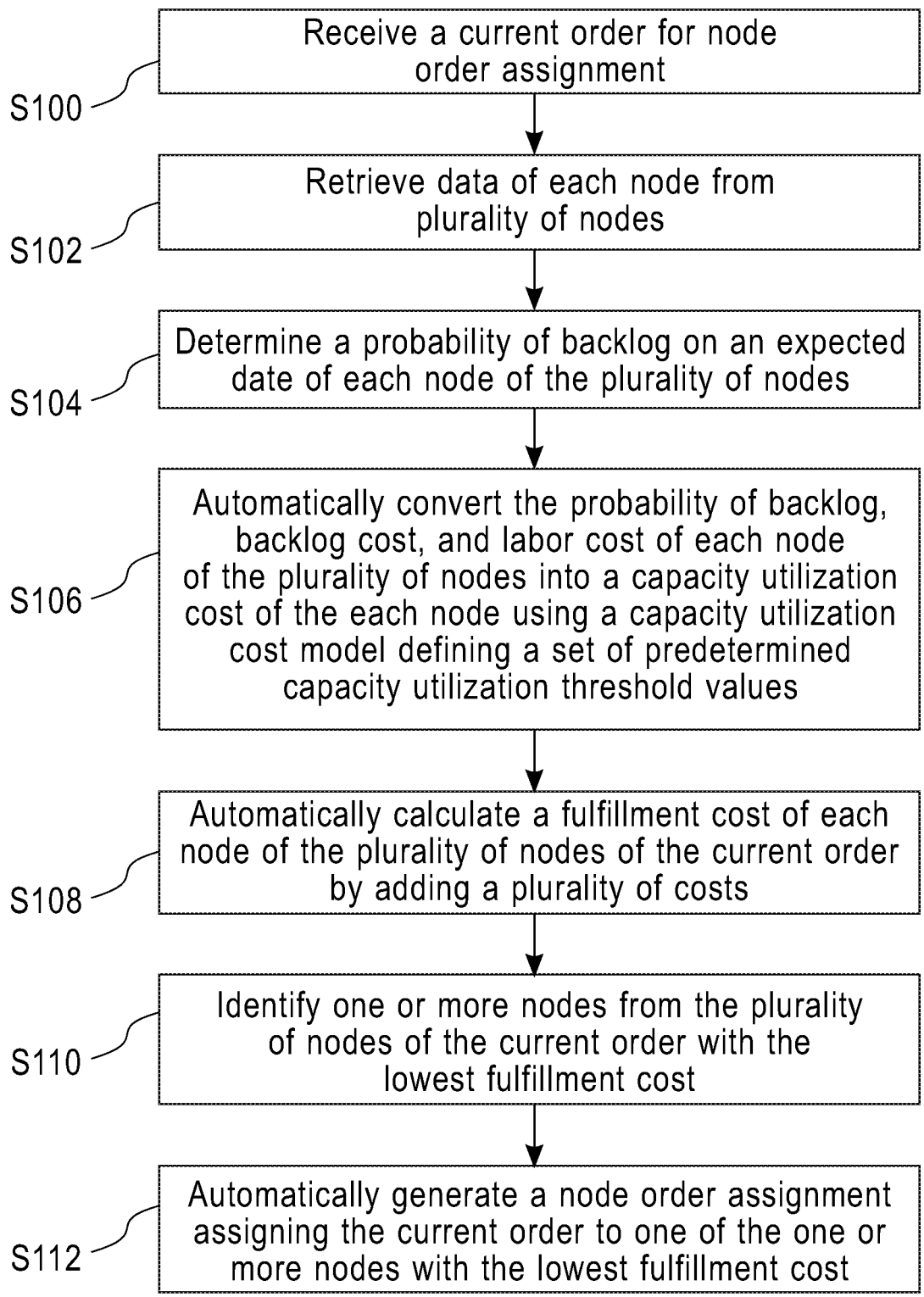
FIG. 1 is a flow chart of the steps of one embodiment of the method of the invention.

As is shown in FIG. 1, one embodiment of the method of the invention begins with step S100 of receiving a current order for node order assignment. At step S102, the system retrieves data of each node from a plurality of nodes, the retrieved data of each node comprising current capacity utilization. Current capacity utilization is the percentage of total daily capacity used so far in a current day, without taking backlog into consideration, and is calculated from the number of units assigned for processing so far in a current day divided by the capacity of that current day. Current capacity utilization is updated regularly—for example, based on a predetermined time interval or real time. Continuous order assignment to a node increases capacity utilization of that node.

Then, at step S104, the system determines a probability of backlog on an expected ship date of each node of the plurality of nodes, the probability of backlog being based on the retrieved current capacity utilization. The expected ship date of a node is the date on which the current order is expected to be shipped from that node. The probability of backlog on the expected ship date is the probability that the current order will be backlogged on that expected ship date due to lack of capacity given the current capacity utilization level.

Further at step S106, the system automatically converts the probability of backlog, backlog cost, and labor cost of each node of the plurality of nodes into a capacity utilization cost of the each node using a capacity utilization cost model defining a set of predetermined capacity utilization threshold values. Backlog cost is the average cost per unit associated with expediting backlogged order. Backlog cost can increase for each day an order is waiting to be shipped and can also take into account the shipping cost of an order. Labor cost is the cost of labor per unit pick up. The set of predetermined capacity utilization threshold values can be set by the retailers according to their own objective weighting. One example of determining the set of the capacity utilization threshold values is to evenly break up the capacity utilization into a set of threshold values having equal intervals.

At step S108, the system automatically calculates a fulfillment cost of each node of the plurality of nodes of the current order by adding a plurality of costs. In one embodiment, the plurality of costs includes shipping cost and the capacity utilization cost. At step S110, the system further identifies one or more nodes from the plurality of nodes of the current order with the lowest fulfillment cost. Finally, at step S112, the system automatically generates a node order assignment assigning the current order to one of the one or more nodes with the lowest fulfillment cost.

In one embodiment, the retrieved data of each node further comprises backlog data, capacity of a current day, and capacity of a future day. Backlog data is the backlog units at the beginning of the current day. Capacity of a current day is a planned capacity in units of the current day. Capacity of a future day is a planned capacity in units of a day in the future of the current day. In another embodiment, the system further automatically calculates an actual capacity utilization on the expected ship date of each node of the plurality of nodes, the actual capacity utilization being based on the retrieved current capacity utilization, capacity of a current day, the capacity of a future day, and the backlog. The actual capacity utilization differs from the current capacity utilization by taking backlog into consideration.

In one embodiment, when there is enough capacity for the current day, the actual capacity utilization is calculated by adding the result of the backlog divided by the capacity of a current day to the current capacity utilization. In another embodiment, when there is not enough capacity for the current day, the actual capacity utilization is calculated by the backlog on an expected ship date divided by the capacity of that day, where the backlog on an expected ship date is calculated by adding the result of the current capacity utilization multiplied by the capacity of a current day to the backlog and subtracting the result of the capacity of each day before the expected ship date multiplied by the backlog days of the current order before the expected ship date.

Figure 2:
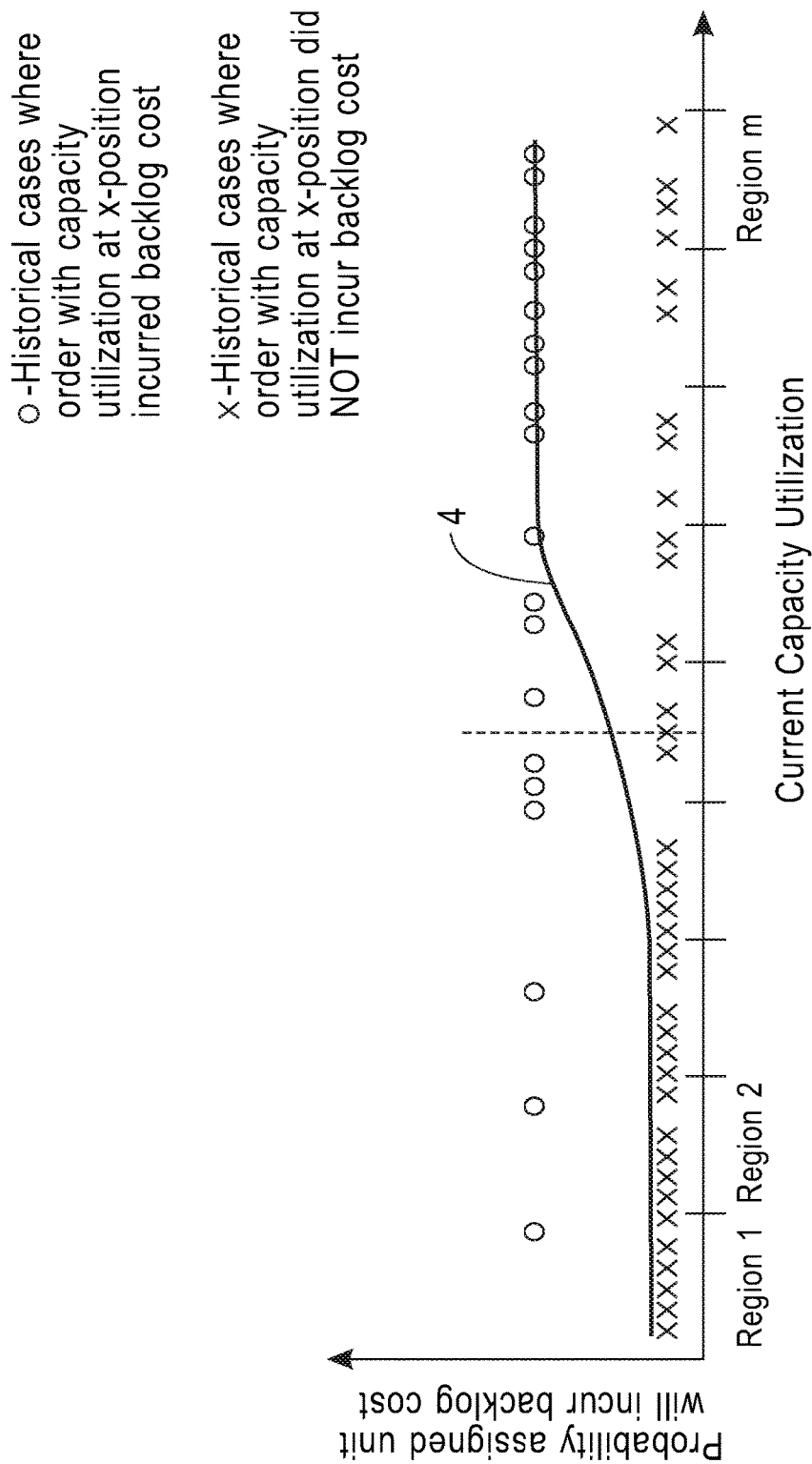
FIG. 2 is a graph of determining the probability of backlog based on historical data of current capacity utilization.

In one embodiment, the probability of backlog is calculated by historical data of backlogged orders at the current capacity utilization divided by historical data of total orders at the current capacity utilization. One example of determining the probability of backlog is shown in FIG. 2. Given a node was assigned to an order, the system computes the current capacity utilization of that node at the assignment time and records whether the order eventually became backlogged (could not be processed on the same day that the order was assigned to that node). From historical data, the system considers order status of a day (1 if the order was backlogged, 0 if the order was not backlogged) as a probabilistic function based on current capacity utilization at the time of order sourcing. The system then divides the current capacity utilization into region 1, region 2 . . . region m, which can be customized by retailers. For a given interval of current capacity utilization in one of the divided regions, the system computes the probability of backlog from the number of backlogged orders in the historical data at the interval divided by the total orders recorded in the historical data at that interval.

The probability of backlog can be direct counts in each utilization region or an actual continuous, fitted probabilistic model, such as a logistic regression model, a kernel regression, or similar model. One example of fitting of probabilistic model is shown as the sigmoid 4 in FIG. 2, which gives retailers choice to set up a threshold value above which probability of backlog is significant. In this example, the retailer can avoid node assignment for nodes having a probability of backlog value above the significant threshold. For both direct count and continuous model approach, probability of backlog as a function of utilization can be incorporated through techniques such as adding constraints in the modeling or using Bayesian priors.

Figure 3:
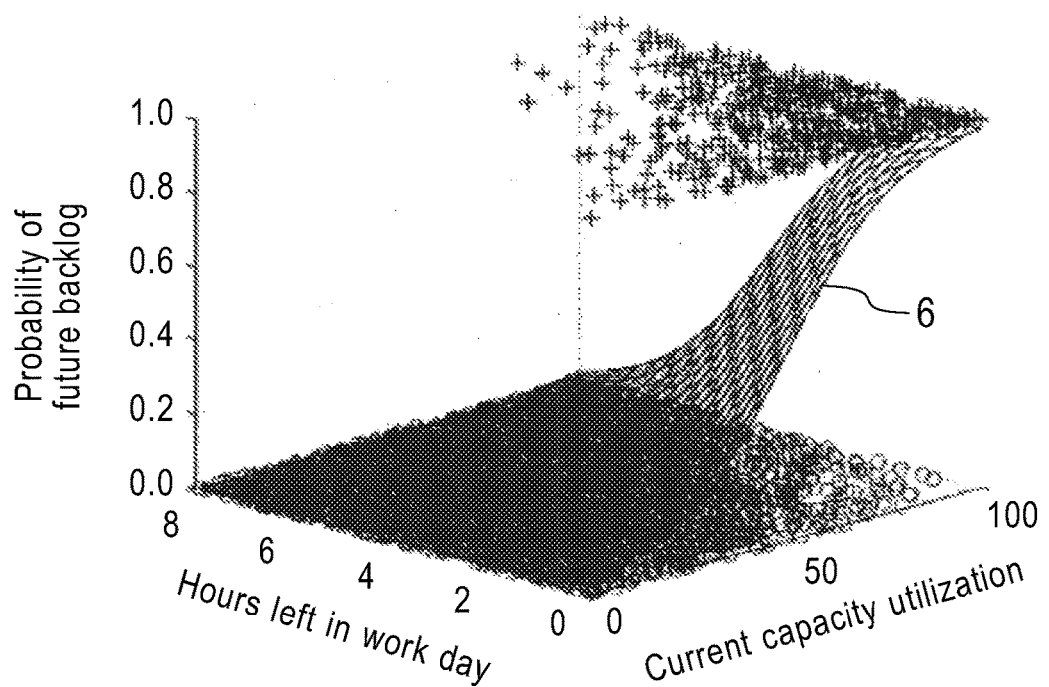
FIG. 3 is a graph of determining the probability of backlog based on retrieved data of current capacity utilization and hours left in a current day.

In another embodiment, the probability of backlog is further based on hours left in the current day. FIG. 3 is one example of plot of historical data for computing the probability of backlog based on the current capacity utilization and the hours left in the current day. Given a node was assigned to an order, the system computes the current capacity utilization of that node and the hours left in the current day of that node both at the time the order is assigned. The system then records whether the order eventually became backlogged (could not be processed on the same day that the order was assigned to that node). From historical data, the system considers order status (whether an order becomes backlogged) as a probabilistic function based on the current capacity utilization at the time of order sourcing and the hours left in the current day. The system then divides both the current capacity utilization and the hours left in the current day into different intervals. For a given interval restricted by the current capacity utilization and the hours left in the current day, the system computes the probability of backlog from the number of backlogged orders in the historical data divided by the total orders recorded in the historical data at that interval.

The probability of backlog can be direct counts in each utilization region or an actual continuous, fitted probabilistic model, such as a logistic regression model, a kernel regression, or similar model. One example of fitting of probabilistic model is shown as the sigmoid 6 in FIG. 3, which gives retailers choice to set up a threshold value above which probability of backlog is significant. In this example, the retailer can avoid node assignment for nodes having a probability of backlog value above the significant threshold. For both direct count and continuous model approach, probability of backlog as a function of utilization can be incorporated through techniques such as adding constraints in the modeling or using Bayesian priors.

In one embodiment, the method further comprises determining a number of days of backlog on an expected ship date of each node of the plurality of nodes. The number of days of backlog is based on the retrieved current capacity utilization. The capacity utilization cost further considers the number of days of backlog. The probability of an order having different possible number of days (0 days, 1 day, 2 days etc.) of backlog is retrieved from historical data. Upon assigning an order to a node, the order has a probability of being backlogged for 0 days, 1 day, 2 days, etc. For each historical order, the final number of days that order was in backlog is taken along with the state of the node at the time the order was assigned, including current capacity utilization, cumulative capacity utilization level (actual capacity utilization), as well as other possible input features such as hours left in the day. A probabilistic model is designed that provides as output the number of days of backlog given the state of the node as input features The input features can be set to a count probability distribution such as the Poisson distribution the Negative Binomial distribution, or Gamma distribution. For example, in the Poisson distribution model, the variables are predictors for the rate parameter of the distribution. The Poisson distribution assigns a probability to each value 0, 1, through infinity—corresponding to the probability for 0, 1, etc. of the number of days of backlog. The parameters for the probabilistic model are chosen such that they minimize the statistical risk given the observed historical data, or any other number of statistical inference techniques. Furthermore, a cost of backlog is associated with each number of days (0 days, 1 day, 2 days etc.), reflecting the cost incurred if the order were backlogged for that number of days. Finally, the capacity utilization cost is then determined as the expected cost under this per-day distribution and costs. For example, the probability of 0 day of backlog multiplied by the cost of 0 day of backlog, plus the probability of 1 day of backlog multiplied by the cost of 1 day of backlog, and so on. The model then automatically sums up a total cost incurred by the possible backlog days for rendering a capacity utilization cost.

Figure 4:
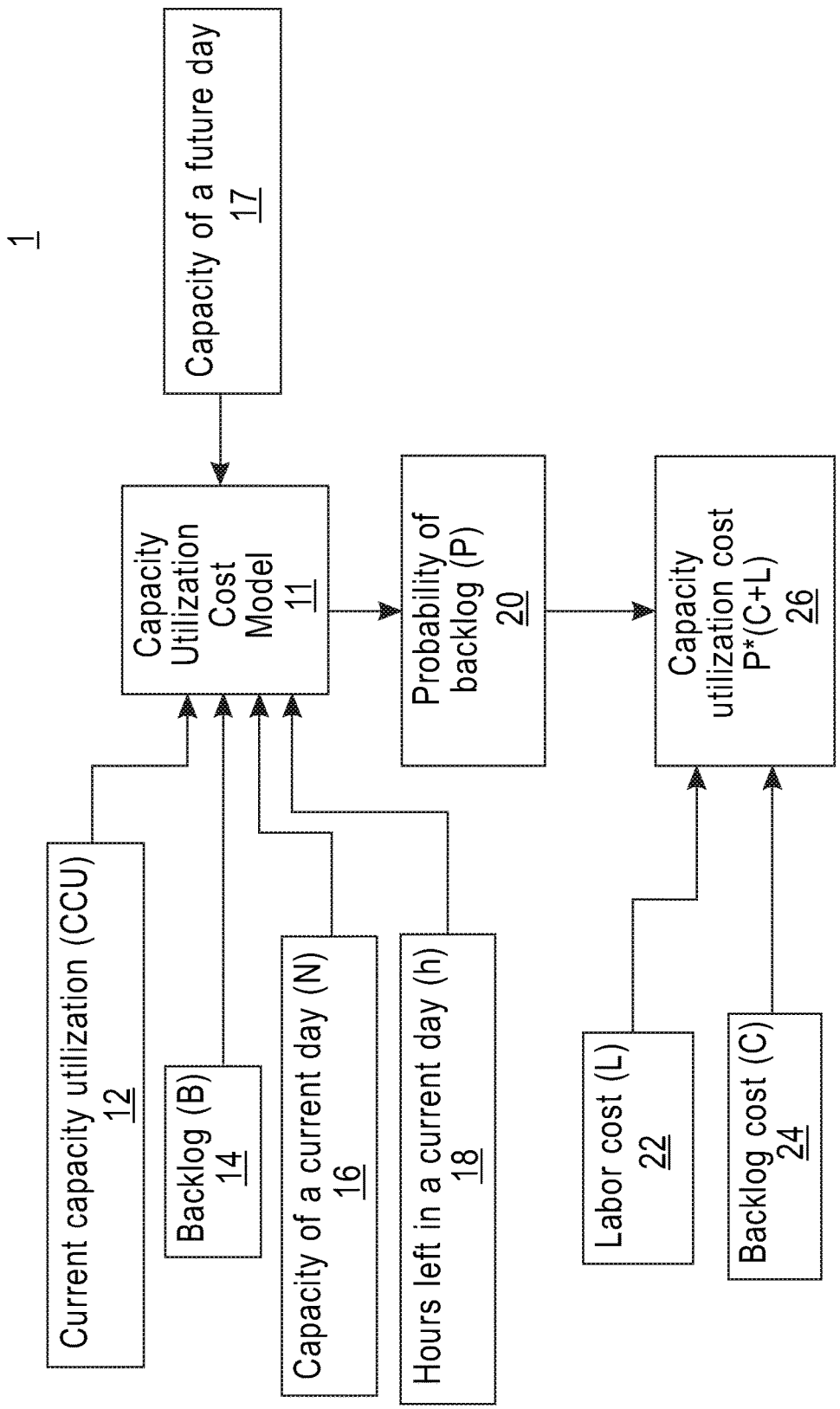
FIG. 4 is a block diagram of one embodiment of the system of the invention.

FIG. 4 depicts one embodiment of a capacity utilization cost system 1. The capacity utilization cost model 11 takes current capacity utilization 12, backlog 14, capacity of a current day 16, capacity of a future day 17 and hours left in a current day 18 to determine the probability of backlog 20. The capacity utilization cost model 11 then takes labor cost 22, backlog cost 24 and the determined probability of backlog 20 into consideration for automatically converting them into a capacity utilization cost 26.

Figure 5:
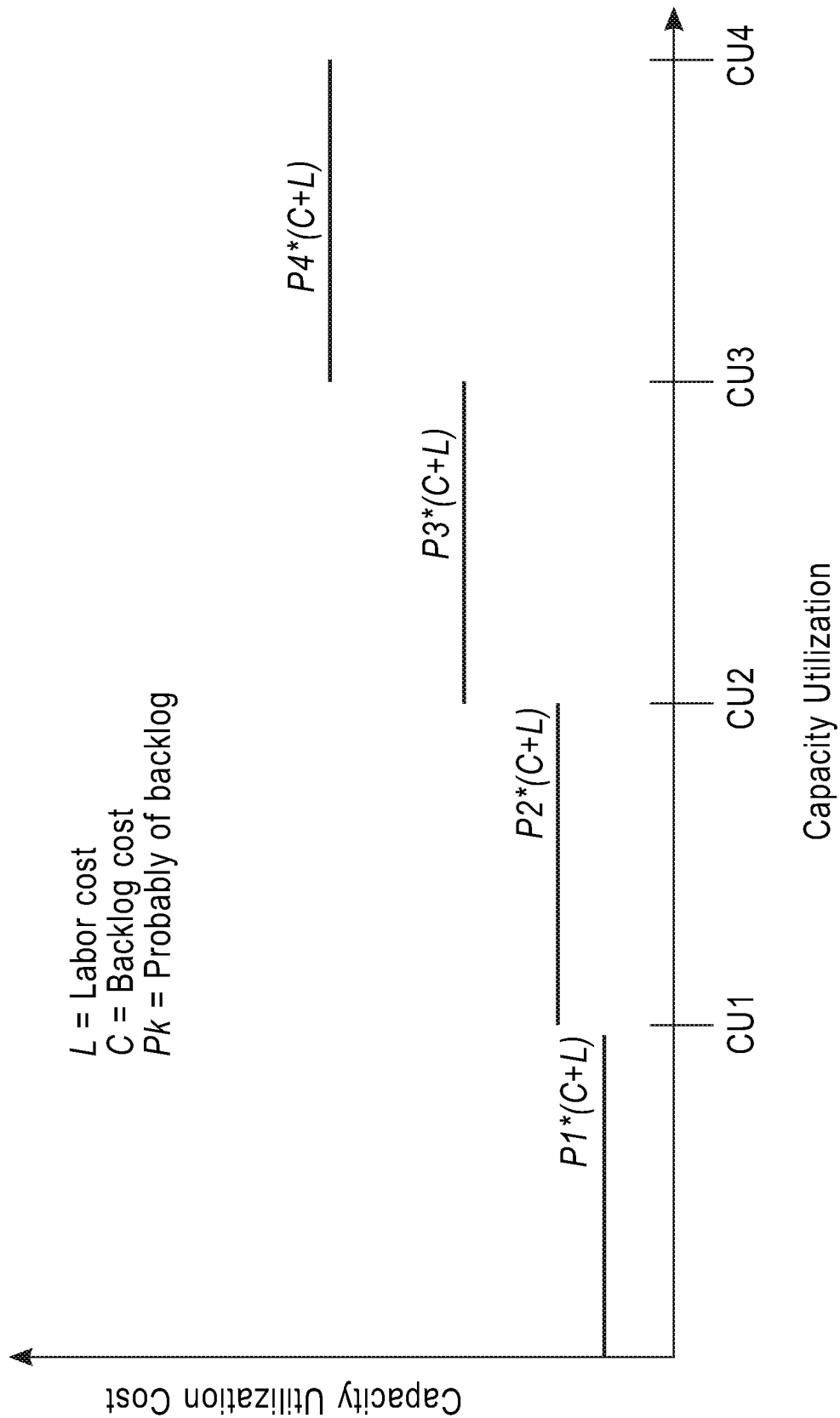
FIG. 5 is a graph of the calculation of a capacity utilization cost in the system of the invention.

FIG. 5 depicts one embodiment of the calculation and conversion of collected data into a capacity utilization cost inside the capacity utilization cost model. CU1, CU2, CU3 and CU4 are predetermined capacity utilization threshold values defined by the model. The predetermined capacity utilization threshold values can be customized by retailers based on their own needs. The system determines a probability of backlog from retrieved current capacity utilization data that is corresponded in the predetermined capacity utilization threshold values. The system then converts the probability of backlog, backlog cost, and labor cost into a capacity utilization cost.

Figure 6:
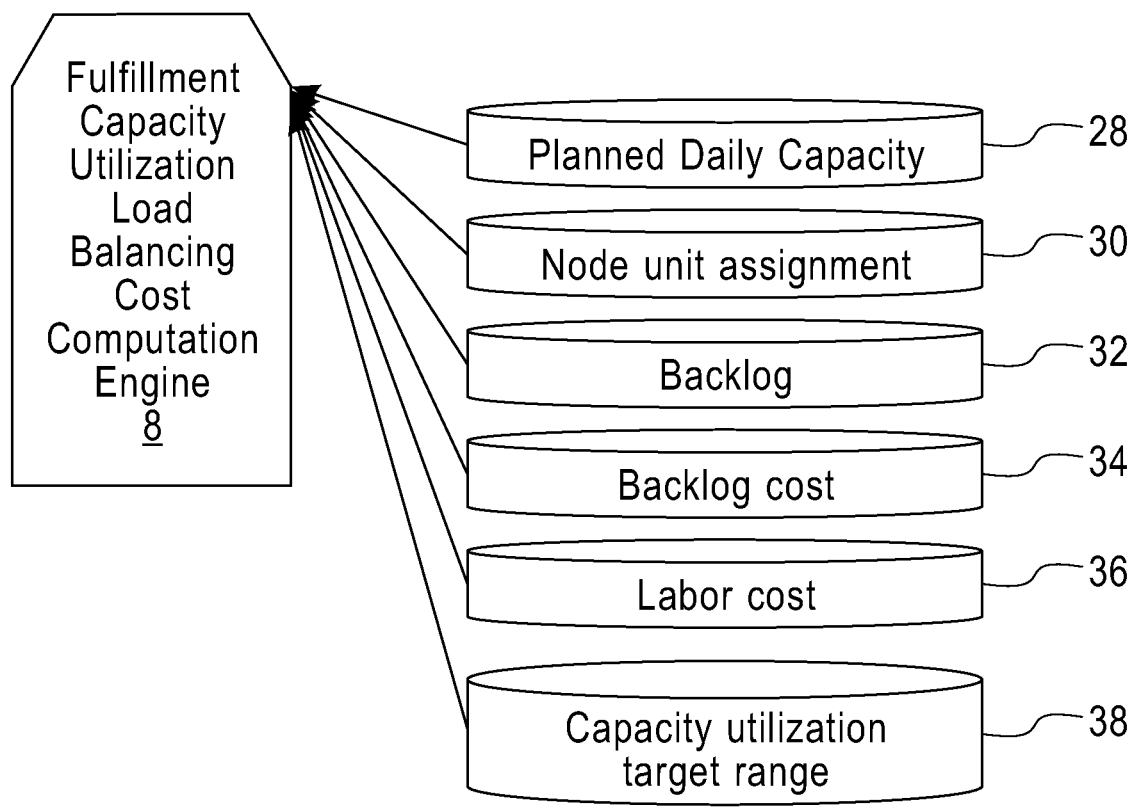
FIG. 6 is a block diagram of one embodiment of the computation engine of the invention.

As is shown in FIG. 6, the diagram depicts one embodiment of the fulfillment capacity utilization load balancing cost computation engine 8. The fulfillment capacity utilization load balancing cost computation engine 8 considers the capacity of a current day and the capacity of a future day from a planned daily capacity database 28, the number of units assigned from a node unit assignment database 30, backlog from a backlog database 32, backlog cost from a backlog cost database 34, labor cost from a labor cost database 36 and predetermined capacity utilization threshold values from a capacity utilization target range database 38 for converting the data considered into a capacity utilization cost.

Figure 7:
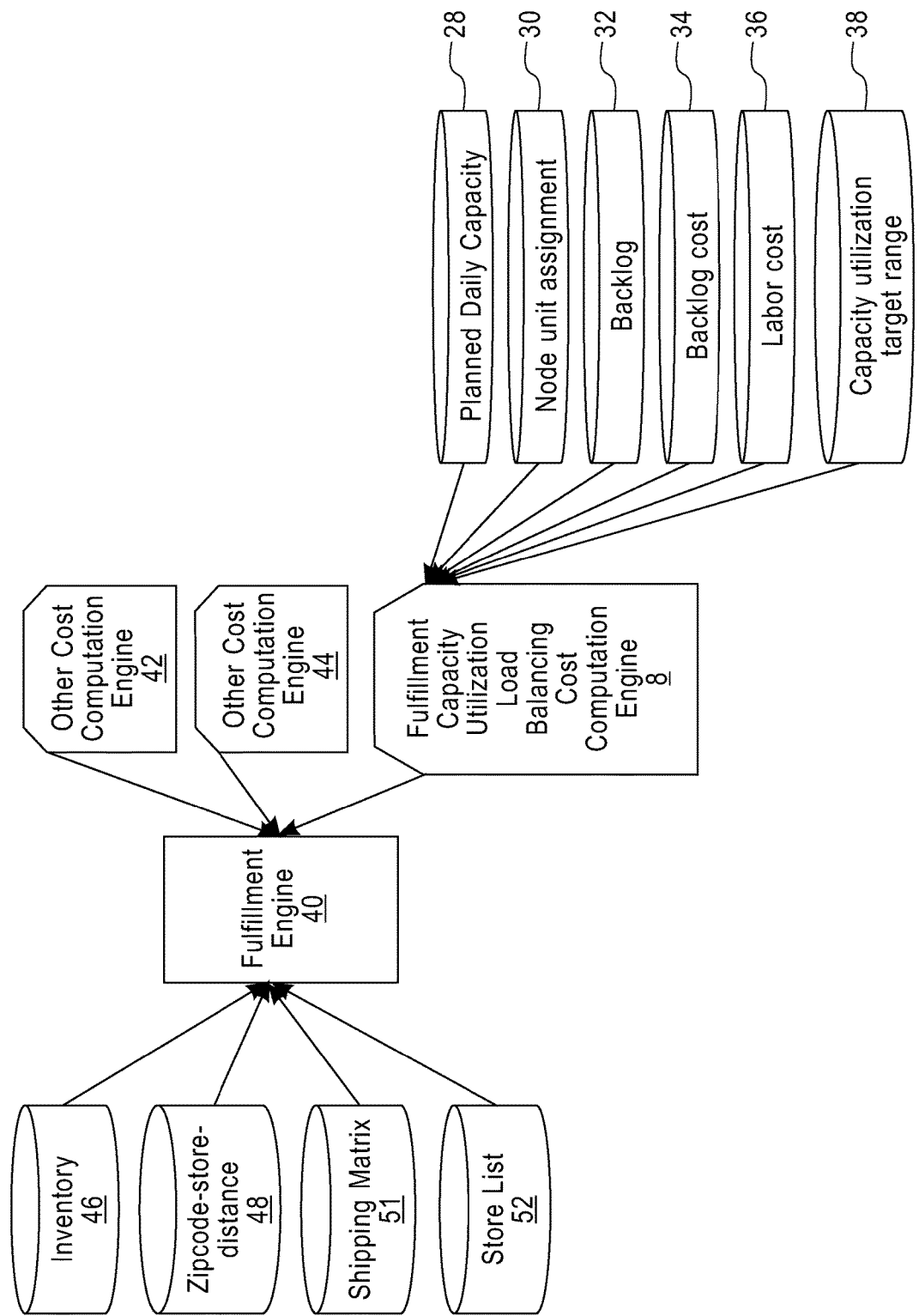
FIG. 7 is a block diagram of one embodiment of the integration between the computation engine of the invention with a fulfillment engine and other cost computation engines.

As is shown in FIG. 7, the diagram depicts one embodiment of the integration between the fulfillment capacity utilization load balancing cost computation engine 8 with a fulfillment engine 40, other cost computation engine 42 and other cost computation engine 44. One example of the other cost computation engine 42 is a cancelation cost computation engine, which takes a variety of data into consideration. The data includes order scheduled, order release status and labor cost. One example of the other cost computation engine 44 is a loyalty reward module, which takes a variety of data into consideration. The data includes customer loyalty reward data and carrier and shipping method specific $CO_2$/miles data. The data considered by other cost computation engine 42 and other cost computation engine 44 can be overlapping. The fulfillment engine 40 minimizes a fulfillment cost of an order applying customer business objective weighting to costs calculated from the fulfillment capacity utilization load balancing cost computation engine 8, other cost computation engine 42, other cost computation engine 44, and shipping matrix 51. The fulfillment engine 40 obtains inventory data 46, zipcode-store-distance data 48 and store lists 52 for calculating a fulfillment cost and identifying one or more nodes for order fulfillment performance. The system can be implemented as a cloud system or an on-premise system.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure that includes a network of interconnected nodes.

Figure 8:
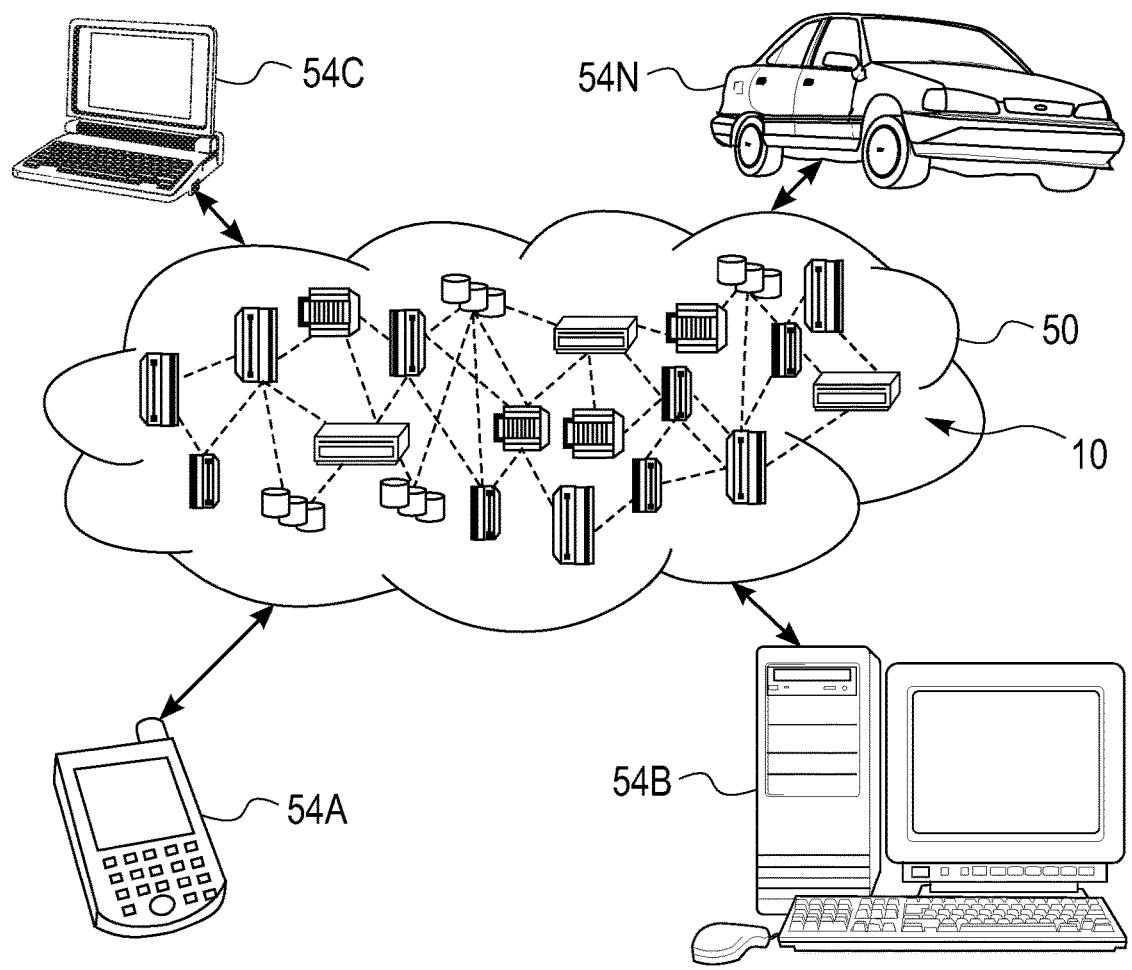
FIG. 8 depicts a cloud computing environment according to an embodiment of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
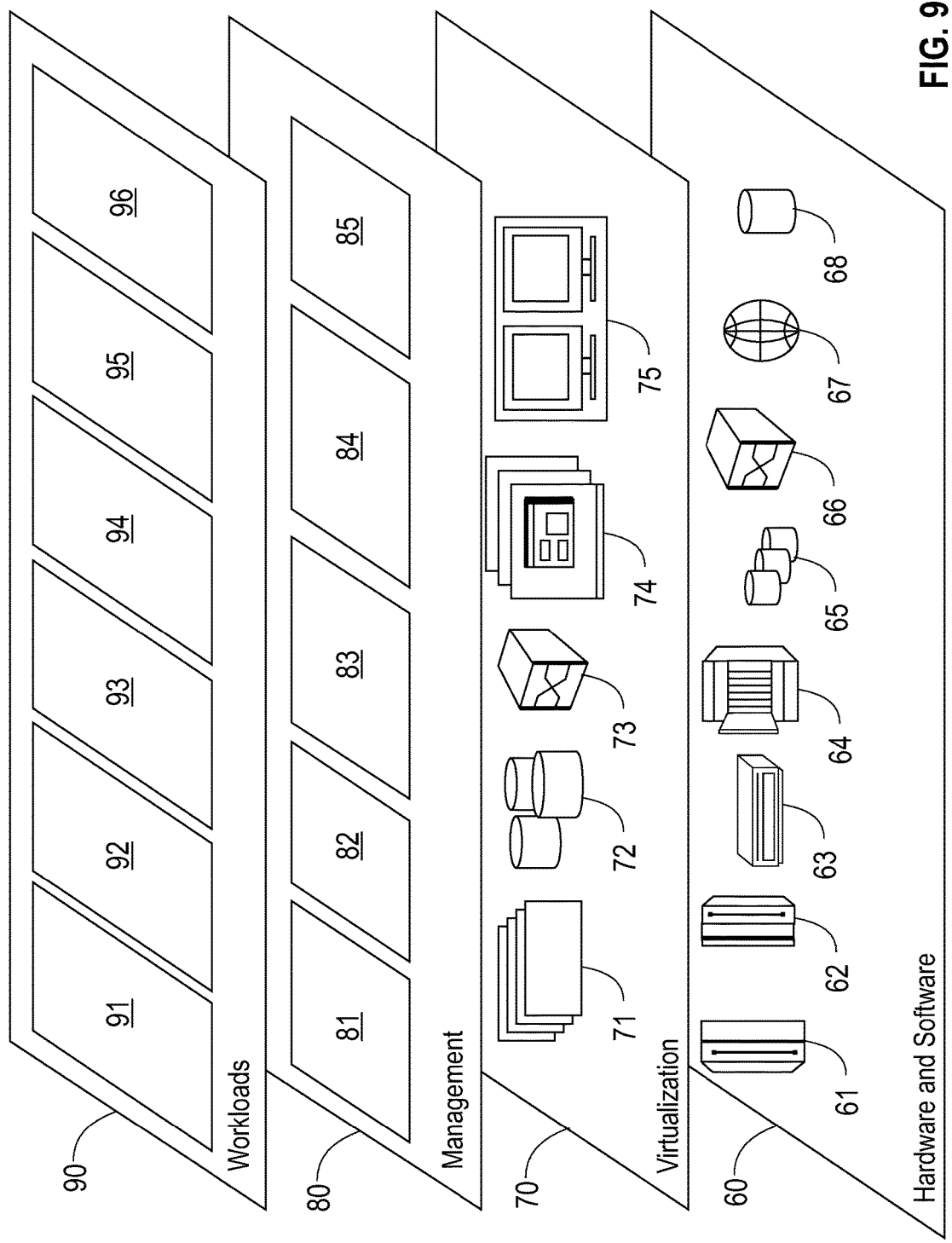
FIG. 9 depicts abstraction model layers according to an embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and order fulfillment optimization 96.

Figure 10:
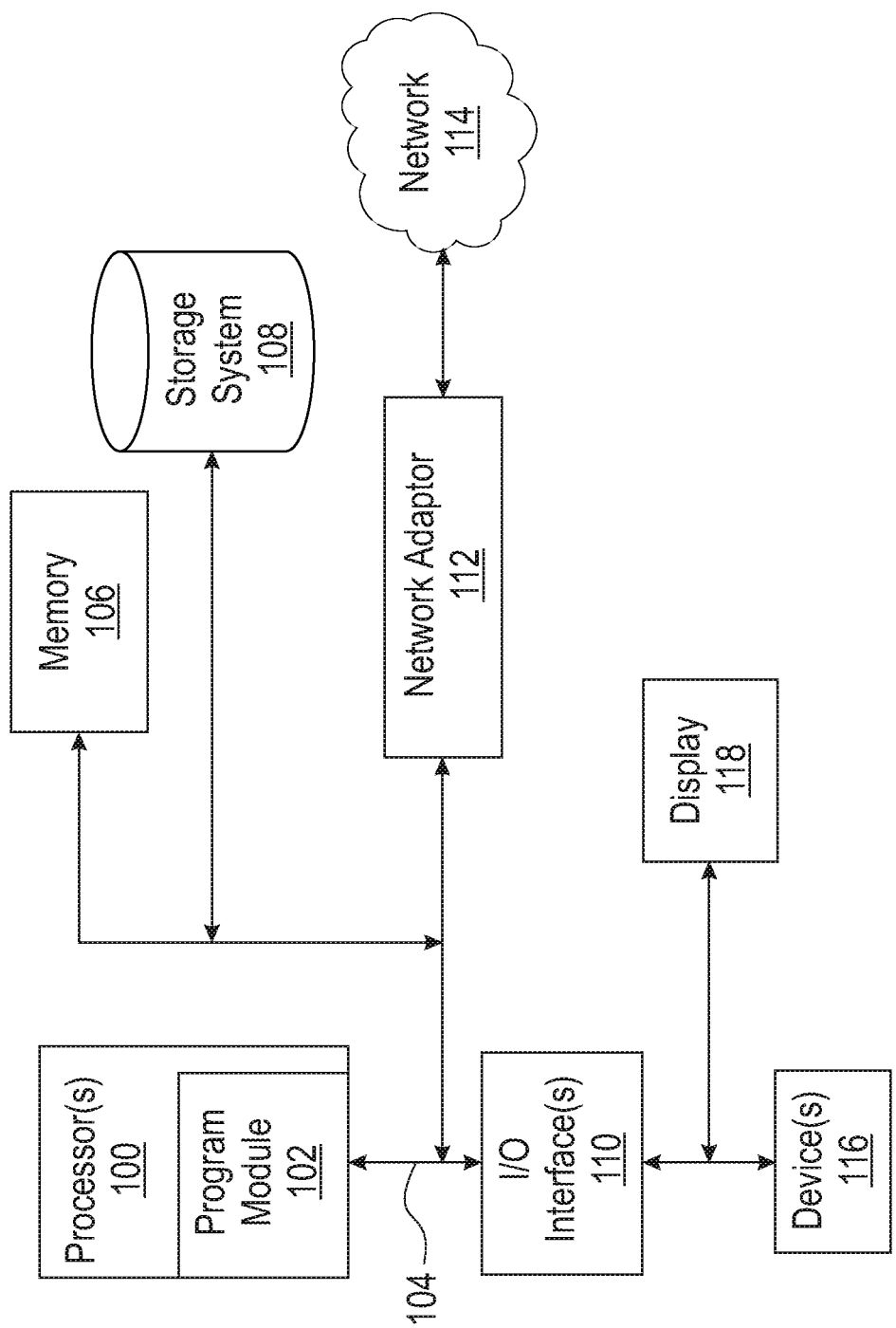
FIG. 10 is a block diagram of an exemplary computing system suitable for implementation of this invention.

FIG. 10 illustrates a schematic of an example computer or processing system that may implement the method for evaluating node fulfillment capacity in node order assignment. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 10 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 100, a system memory 106, and a bus 104 that couples various system components including system memory 106 to processor 100. The processor 100 may include a program module 102 that performs the methods described herein. The module 102 may be programmed into the integrated circuits of the processor 100, or loaded from memory 106, storage device 108, or network 114 or combinations thereof.

Bus 104 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 106 can include computer system readable media in the form of volatile memory, such as random access memory (RAM) and/or cache memory or others. Computer system may further include other removable/non-removable, volatile/non-volatile computer system storage media. By way of example only, storage system 108 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 104 by one or more data media interfaces.

Computer system may also communicate with one or more external devices 116 such as a keyboard, a pointing device, a display 118, etc.; one or more devices that enable a user to interact with computer system; and/or any devices (e.g., network card, modem, etc.) that enable computer system to communicate with one or more other computing devices. Such communication can occur via Input/Output (I/O) interfaces 110.

Still yet, computer system can communicate with one or more networks 114 such as a local area network (LAN), a general wide area network (WAN), and/or a public network (e.g., the Internet) via network adapter 112. As depicted, network adapter 112 communicates with the other components of computer system via bus 104. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a non-transitory computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

In addition, while preferred embodiments of the present invention have been described using specific terms, such description is for illustrative purposes only, and it is to be understood that changes and variations may be made without departing from the spirit or scope of the following claims.

What is claimed is:

1. A computer implemented method for evaluating node fulfillment capacity in node order assignment, comprising:
receiving a current order for node order assignment;
retrieving data of each node from a plurality of nodes, the retrieved data of each node comprising current capacity utilization;
determining a probability of backlog on an expected ship date of each node of the plurality of nodes, the probability of backlog being based on the retrieved current capacity utilization;
automatically converting the probability of backlog, backlog cost, and labor cost of each node of the plurality of nodes into a capacity utilization cost of each node of the plurality of nodes using a capacity utilization cost model defining a set of predetermined capacity utilization threshold values;
automatically calculating a fulfillment cost of each node of the plurality of nodes of the current order by adding a plurality of costs, the plurality of costs comprising shipping cost and the capacity utilization cost;
identifying one or more nodes from the plurality of nodes of the current order with the lowest fulfillment cost; and
automatically generating a node order assignment assigning the current order to one of the one or more nodes of the plurality of nodes with the lowest fulfillment cost.

2. The method of claim 1, wherein the retrieved data of each node further comprising backlog data, capacity of a current day, and capacity of a future day.

3. The method of claim 2, further comprising automatically calculating an actual capacity utilization on the expected ship date of each node of the plurality of nodes, the actual capacity utilization being based on the retrieved current capacity utilization, the capacity of a current day, the capacity of a future day, and the backlog data and wherein the capacity utilization cost model further uses the actual capacity utilization in determining the probability of backlog.

4. The method of claim 3, wherein the actual capacity utilization is calculated by adding the result of the backlog divided by the capacity of a current day to the current capacity utilization, when the capacity of a current day is enough to fulfill the current order, and the actual capacity utilization is calculated by backlog on an expected ship date divided by the capacity of the expected ship day, the backlog on an expected ship date being calculated by adding the result of the current capacity utilization multiplied by the capacity of a current day to the backlog, and subtracting the result of the capacity of each day before the expected ship date multiplied by the backlog days of the current order before the expected ship date, when the capacity of a current day is not enough to fulfill the current order.

5. The method of claim 1, wherein the probability of backlog is calculated by historical data of backlogged orders at the current capacity utilization divided by historical data of total orders at the current capacity utilization.

6. The method of claim 1, wherein the probability of backlog is further based on hours left in the current day.

7. The method of claim 1, further comprising determining a number of days of backlog on an expected ship date of each node of the plurality of nodes, the number of days of backlog being based on the retrieved current capacity utilization and wherein the capacity utilization cost model further considers the number of days of backlog in determining the capacity utilization cost of each node of the plurality of nodes.

8. A computer system for determining node order assignment, comprising:
   a memory; and
   a processor configured to:
      receiving a current order for node order assignment;
      retrieving data of each node from a plurality of nodes, the retrieved data of each node comprising current capacity utilization;
      determining a probability of backlog on an expected ship date of each node of the plurality of nodes, the probability of backlog being based on the retrieved current capacity utilization;
      automatically converting the probability of backlog, backlog cost, and labor cost of each node of the plurality of nodes into a capacity utilization cost of each node of the plurality of nodes using a capacity utilization cost model defining a set of predetermined capacity utilization threshold values;
      automatically calculating a fulfillment cost of each node of the plurality of nodes of the current order by adding a plurality of costs, the plurality of costs comprising shipping cost and the capacity utilization cost;
      identifying one or more nodes from the plurality of nodes of the current order with the lowest fulfillment cost; and
      automatically generating a node order assignment assigning the current order to one of the one or more nodes of the plurality of nodes with the lowest fulfillment cost.

9. The computer system of claim 8, wherein the retrieved data further comprising backlog data, capacity of a current day, and capacity of a future day and further comprising automatically calculating an actual capacity utilization on the expected ship date of each node of the plurality of nodes, the actual capacity utilization being based on the retrieved current capacity utilization, the capacity of a current day, the capacity of a future day, and the backlog data and wherein the capacity utilization cost model further uses the actual capacity utilization in determining the probability of backlog.

10. The computer system of claim 9, wherein the actual capacity utilization is calculated by adding the result of the backlog divided by the capacity of a current day to the current capacity utilization, when the capacity of a current day is enough to fulfill the current order, and the actual capacity utilization is calculated by backlog on an expected ship date divided by the capacity of the expected ship day, the backlog on an expected ship date being calculated by adding the result of the current capacity utilization multiplied by the capacity of a current day to the backlog, and subtracting the result of the capacity of each day before the expected ship date multiplied by the backlog days of the current order before the expected ship date, when the capacity of a current day is not enough to fulfill the current order.

11. The computer system of claim 8, wherein the probability of backlog is calculated by historical data of backlogged orders at the current capacity utilization divided by historical data of total orders at the current capacity utilization.

12. The computer system of claim 8, wherein the probability of backlog is further based on hours left in the current day.

13. The computer system of claim 8, further comprising determining a number of days of backlog on an expected ship date of each node of the plurality of nodes, the number of days of backlog being based on the retrieved current capacity utilization and wherein the capacity utilization cost model further considers the number of days of backlog in determining the capacity utilization cost of each node of the plurality of nodes.

14. The computer system of claim 8, wherein the capacity of a current day is collected from a planned daily capacity database, the current capacity utilization is based on a node unit assignment database, the backlog data is collected from a backlog database, the backlog cost is collected from a backlog cost database, the labor cost is collected from a labor cost database, and the predetermined capacity utilization threshold is collected from a capacity utilization target range database.

15. A non-transitory article of manufacture tangibly embodying computer readable instructions, which when implemented, cause a computer to perform the steps of a method for determining node order assignment, comprising:
   receiving a current order for node order assignment;
   retrieving data of each node from a plurality of nodes, the retrieved data of each node comprising current capacity utilization;
   determining a probability of backlog on an expected ship date of each node of the plurality of nodes, the probability of backlog being based on the retrieved current capacity utilization;
   automatically converting the probability of backlog, backlog cost, and labor cost of each node of the plurality of nodes into a capacity utilization cost of each node of the plurality of nodes using a capacity utilization cost model defining a set of predetermined capacity utilization threshold values;
   automatically calculating a fulfillment cost of each node of the plurality of nodes of the current order by adding a plurality of costs, the plurality of costs comprising shipping cost and the capacity utilization cost;
   identifying one or more nodes from the plurality of nodes of the current order with the lowest fulfillment cost; and
   automatically generating a node order assignment assigning the current order to one of the one or more nodes of the plurality of nodes with the lowest fulfillment cost.

16. A non-transitory article of manufacture of claim 15, wherein the retrieved data further comprising backlog data, capacity of a current day, and capacity of a future day and further comprising automatically calculating an actual capacity utilization on the expected ship date of each node of the plurality of nodes, the actual capacity utilization being based on the retrieved current capacity utilization, the capacity of a current day, the capacity of a future day and the backlog data and wherein the capacity utilization cost model further uses the actual capacity utilization in determining the probability of backlog.

17. A non-transitory article of manufacture of claim 16, wherein the actual capacity utilization is calculated by adding the result of the backlog divided by the capacity of a current day to the current capacity utilization, when the capacity of a current day is enough to fulfill the current order, and the actual capacity utilization is calculated by backlog on an expected ship date divided by the capacity of the expected ship day, the backlog on an expected ship date being calculated by adding the result of the current capacity utilization multiplied by the capacity of a current day to the backlog, and subtracting the result of the capacity of each day before the expected ship date multiplied by the backlog days of the current order before the expected ship date, when the capacity of a current day is not enough to fulfill the current order.

18. A non-transitory article of manufacture of claim 15, wherein the probability of backlog is calculated by historical data of backlogged orders at the current capacity utilization divided by historical data of total orders at the current capacity utilization.

19. A non-transitory article of manufacture of claim 15, wherein the probability of backlog is further based on hours left in the current day.

20. A non-transitory article of manufacture of claim 15, further comprising determining a number of days of backlog on an expected ship date of each node of the plurality of nodes, the number of days of backlog being based on the retrieved current capacity utilization and wherein the capacity utilization cost model further considers the number of days of backlog in determining the capacity utilization cost of each node of the plurality of nodes.

* * * * *